US009429995B2

(12) United States Patent
Byrne et al.

(10) Patent No.: US 9,429,995 B2
(45) Date of Patent: Aug. 30, 2016

(54) DOCKING STATION FOR ELECTRONIC DEVICES

(71) Applicants: Norman R. Byrne, Ada, MI (US); Roger D. Burdi, Grand Rapids, MI (US); Gerald N. Vander Till, Grandville, MI (US)

(72) Inventors: Norman R. Byrne, Ada, MI (US); Roger D. Burdi, Grand Rapids, MI (US); Gerald N. Vander Till, Grandville, MI (US)

(*) Notice: Subject to any disclaimer, the term of this patent is extended or adjusted under 35 U.S.C. 154(b) by 0 days.

(21) Appl. No.: 14/712,221

(22) Filed: May 14, 2015

(65) Prior Publication Data
US 2015/0331452 A1 Nov. 19, 2015

Related U.S. Application Data

(60) Provisional application No. 61/993,849, filed on May 15, 2014.

(51) Int. Cl.
G06F 1/16 (2006.01)
H01R 35/04 (2006.01)

(52) U.S. Cl.
CPC ............. G06F 1/1632 (2013.01); H01R 35/04 (2013.01)

(58) Field of Classification Search
CPC ........................................................ G06F 1/16
USPC .................... 361/679.49, 679.4–679.45, 683
See application file for complete search history.

(56) References Cited

U.S. PATENT DOCUMENTS

| 6,193,546 | B1* | 2/2001 | Sadler .................. A45F 5/02 |
| | | | 439/165 |
| 6,926,130 | B2 | 8/2005 | Skowronski |
| 7,054,148 | B2 | 5/2006 | Chen et al. |
| 7,230,822 | B2* | 6/2007 | Langberg ............ G11B 33/122 |
| | | | 248/917 |
| 7,247,032 | B2 | 7/2007 | Merz |
| 7,272,420 | B2 | 9/2007 | Falcon et al. |
| 7,347,723 | B1 | 3/2008 | Daily |
| 7,352,567 | B2 | 4/2008 | Hotelling et al. |
| 7,580,254 | B2 | 8/2009 | Anderson |
| 7,580,255 | B2 | 8/2009 | Crooijmans et al. |
| 7,643,283 | B2 | 1/2010 | Jubelirer et al. |
| 7,719,830 | B2 | 5/2010 | Howarth et al. |
| 7,929,291 | B2 | 4/2011 | Park et al. |
| 8,090,130 | B2 | 1/2012 | Zorkendorfer et al. |
| 8,145,821 | B2 | 3/2012 | Mead et al. |
| 8,480,429 | B2 | 7/2013 | Byrne |
| 8,482,252 | B2 | 7/2013 | Byrne |
| 8,559,172 | B2 | 10/2013 | Byrne |

(Continued)

OTHER PUBLICATIONS

Proposed claim amendments, Proposed Drawing Amendment.*

*Primary Examiner* — Dion R Ferguson
*Assistant Examiner* — Mandeep S Buttar
(74) *Attorney, Agent, or Firm* — Gardner, Linn, Burkhart & Flory, LLP

(57) ABSTRACT

A docking station for mechanically supporting and electrically communicating with an electronic device, such as a portable phone, computer, media player, or the like includes a housing with upper and lower housing surfaces, a device mount pivotably coupled to the housing, and an electrical and mechanical connector on the device mount. The upper housing surface defines an opening through which the connector extends. The opening in the upper housing is sized and shaped to correspond to an upper portion of the device mount, which has arcuate surfaces that remain in close proximity or contact with surfaces defining the opening in the upper housing, to limit or preclude the intrusion of contaminants into the housing regardless of the position of the device mount relative to the housing.

11 Claims, 5 Drawing Sheets

(56) References Cited

U.S. PATENT DOCUMENTS

| | | |
|---|---|---|
| 2003/0172218 A1 | 9/2003 | Scott et al. |
| 2004/0014336 A1 | 1/2004 | Merz |
| 2004/0212822 A1 | 10/2004 | Schinner |
| 2005/0047082 A1 | 3/2005 | Osawa |
| 2005/0168937 A1 | 8/2005 | Yin et al. |
| 2005/0185364 A1 | 8/2005 | Bell et al. |
| 2005/0190542 A1 | 9/2005 | Chee |
| 2005/0201049 A1 | 9/2005 | Osaka |
| 2006/0066753 A1 | 3/2006 | Gennetten et al. |
| 2006/0116009 A1 | 6/2006 | Langberg et al. |
| 2006/0138258 A1 | 6/2006 | Jarvinen |
| 2006/0197753 A1 | 9/2006 | Hotelling |
| 2006/0221565 A1 | 10/2006 | Doherty et al. |
| 2007/0230723 A1 | 10/2007 | Hobson et al. |
| 2008/0002355 A1 | 1/2008 | Carnevali |
| 2008/0164845 A1 | 7/2008 | Choi |
| 2008/0232042 A1 | 9/2008 | Yoshioka |
| 2008/0307144 A1 | 12/2008 | Minoo |

\* cited by examiner

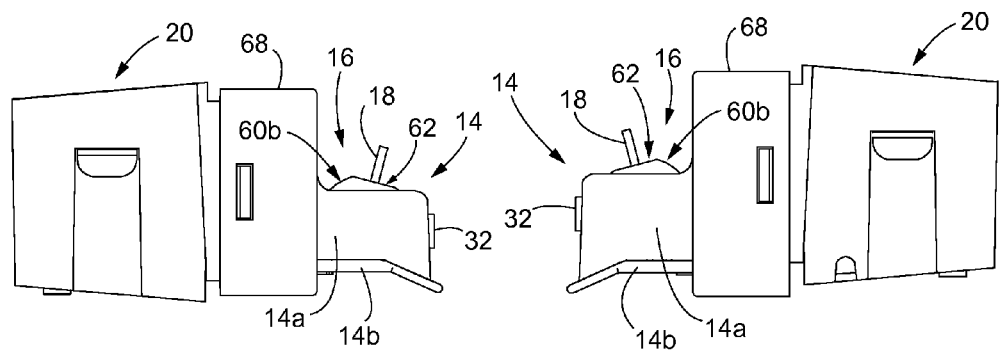
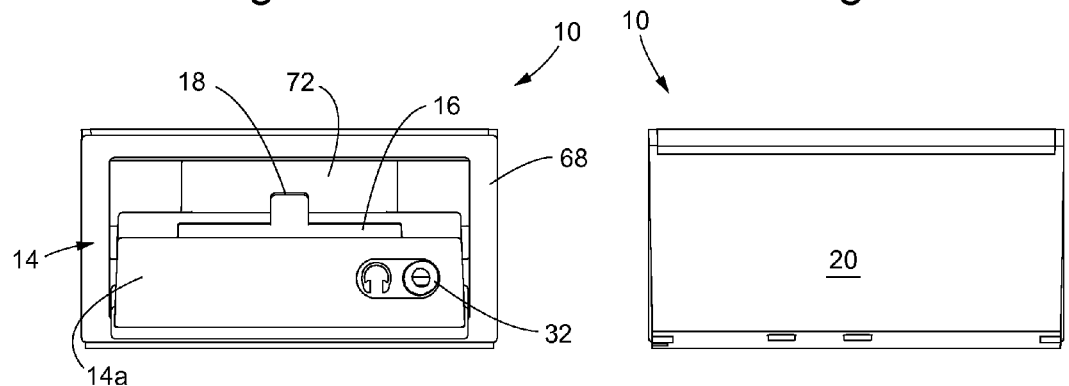
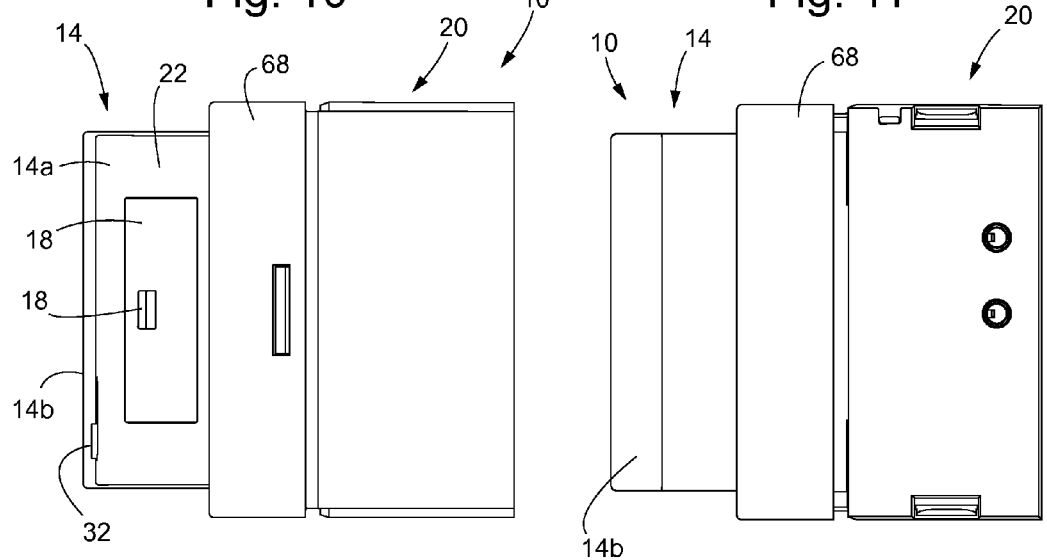

DOCKING STATION FOR ELECTRONIC DEVICES

CROSS REFERENCE TO RELATED APPLICATION

The present application claims the benefit of U.S. provisional application Ser. No. 61/993,849, filed May 15, 2014, which is hereby incorporated herein by reference in its entirety.

FIELD OF THE INVENTION

The present invention relates to docking stations for electronic devices and, more particularly, to devices that provide both mechanical support and electrical or electronic communication with portable phones, handheld computers, portable media players, or the like.

BACKGROUND OF THE INVENTION

Docking stations are commonly used to provide both mechanical support and electrical and/or electronic communication with an electronic device that is placed on the docking station, such as for charging a battery associated with the electronic device and/or providing an electronic data feed to or from the electronic device when it is mounted at the docking station. In some cases, an electrical or electronic coupler physically supports the electronic device while also electrically communicating with the device, while in other cases a docking station may provide a mechanical support or surface that is separate from the electrical/electronic coupler.

SUMMARY OF THE INVENTION

The present invention provides a docking station for electronic devices, in which a movable electrical/mechanical connector physically supports and electrically communicates with an electronic device that is coupled to the docking station via the connector. The connector is pivotable between forward and rearward positions, without creating excessive gaps between the connector and a housing to which it is coupled. The connector is capable of supporting electronic devices of different shapes and sizes, such as portable phones, handheld computers, cameras, media players, and the like. Although it is envisioned that the electrical/mechanical connector is fully capable of mechanically supporting an electronic device in substantially any position of the connector, it is further envisioned that, at least for some larger sizes of electronic devices, the devices may be partially supported by another surface that is associated with the docking station.

According to one form of the present invention, a docking station is provided for supporting and electrically communicating with an electronic device. The docking station includes a housing defining a cavity or interior space between upper and lower surfaces, a device mount with electrical connector, and first and second hinge portions that cooperate to pivotably couple the device mount to the housing. The upper surface of the housing defines an opening between at least a forward inside surface or edge and a rearward inside surface or edge. The first hinge portion is spaced above the lower housing surface and defines a pivot axis. The device mount is configured to support an electronic device and has an upper arcuate surface with forward and rearward portions, as well as a second hinge portion that is spaced above the lower surface and is configured to engage the first hinge portion. The engagement of the hinge portions pivotably couples the device mount so that it is movable between a forward position and a rearward position. The electrical connector projects through the opening and is configured to electrically engage the electrical device when the electrical device is supported at the device mount. The pivot axis defined by the cooperating hinge portions is located such that as the device mount is pivoted between the forward position and the rearward position, the forward portion of the upper arcuate surface maintains substantially fixed spacing relative to the forward inside surface of the cover, and the rearward portion of the upper arcuate surface maintains substantially fixed spacing relative to the rearward inside surface of the cover.

In one aspect, the device mount includes a lower surface with forward and rearward portions. The forward and rearward portions of the lower surface are arranged or positioned so that when the device mount is in the forward position, the forward portion of the lower surface contacts the lower housing surface, and so that when the device mount is in the rearward position, the rearward portion of the lower surface contacts the lower housing surface.

In another aspect, the device mount and the dock housing are configured so that pivoting movement of the device mount relative to the dock housing is resisted only by incidental friction at the first and second hinge portions and/or by incidental contact of the forward and rearward portions of the upper arcuate surface with the forward and rearward inside surfaces of the cover.

In yet another aspect, a portion of the upper arcuate surface of the device mount projects through the opening of the upper housing surface.

In still another aspect, the docking station further includes a main housing in which the dock housing is pivotably mounted. The dock housing is movable between an in-use position in which the dock housing is extended from the main housing, and a non-use position in which the dock housing is at least partially retracted into the main housing.

In a further aspect, a portion of the upper arcuate surface of the device mount projects through the opening of the upper housing surface. Optionally, the upper arcuate surface includes a generally planar central surface disposed between the forward and rearward portions, and the generally planar central surface also projects through the opening of the upper housing surface. Optionally, the electrical connector is positioned at the generally planar central surface. The generally planar central surface may be configured to be engaged by a lower surface of the electronic device, so that at least a portion of the weight of the electronic device is supported by the generally planar central surface of the device mount.

Thus, the docking station of the present invention provides both a mechanical support and an electrical coupling for portable electronic devices, which permits a coupled device to be pivoted according to a user's preferences, while maintaining the mechanical and electrical coupling. During such pivoting movement the minimal spacing between the device mount and the housing remains substantially constant to reduce the likelihood of contaminants entering the housing.

These and other objects, advantages, purposes and features of the present invention will become apparent upon review of the following specification in conjunction with the drawings.

BRIEF DESCRIPTION OF THE DRAWINGS

FIG. 8 is a right side elevation of the docking station;

FIG. 9 is a left side elevation of the docking station;

FIG. 10 is a front elevation of the docking station;

FIG. 11 is a rear elevation of the docking station;

FIG. 12 is another top plan view of the docking station; and

FIG. 13 is a bottom plan view of the docking station.

DESCRIPTION OF THE PREFERRED EMBODIMENTS

A docking station for electronic devices is provided for mechanically supporting and electrically energizing and/or electronically communicating with a portable electronic device that is positioned on or along the docking station. The docking station accommodates different sizes and/or shapes of portable electronic devices, and uses a single connector to both mechanically support and electrically or electronically communicate with the device. The connector permits the electronic device to be moved forward and aft (rearward), such as via a pivoting movement, to adjust a viewing angle or to suit the preferences of a user. In addition, the connector pivots in such a way as to substantially prevent the formation of gaps between the connector and an associated housing, such as to limit or prevent the intrusion of contaminants into the housing. Throughout this specification and the claim, it will be appreciated that the terms "electrical" and "electronic" may be used interchangeably, and are not intended to be limiting in any way.

Figure 5:
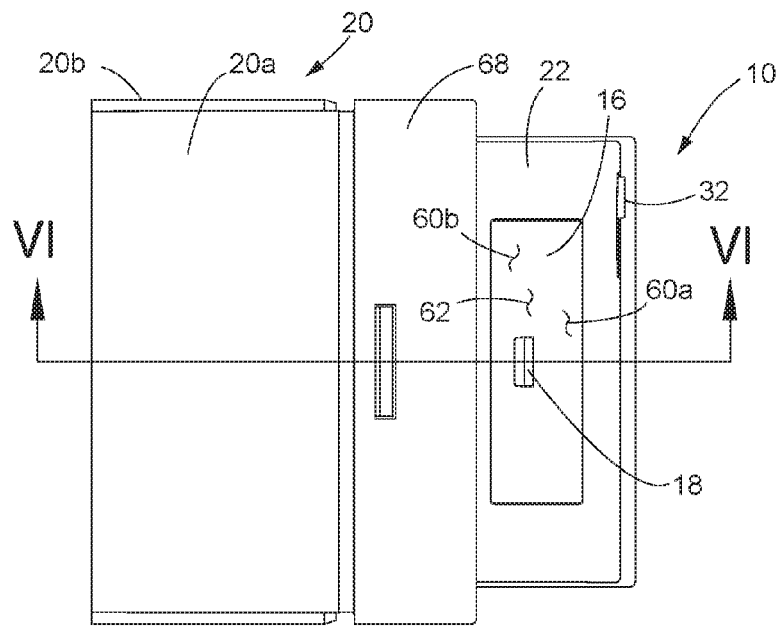
FIG. 5 is another top plan view of the docking station of FIG. 1, in which the connector is pivoted rearward.
Figure 6:
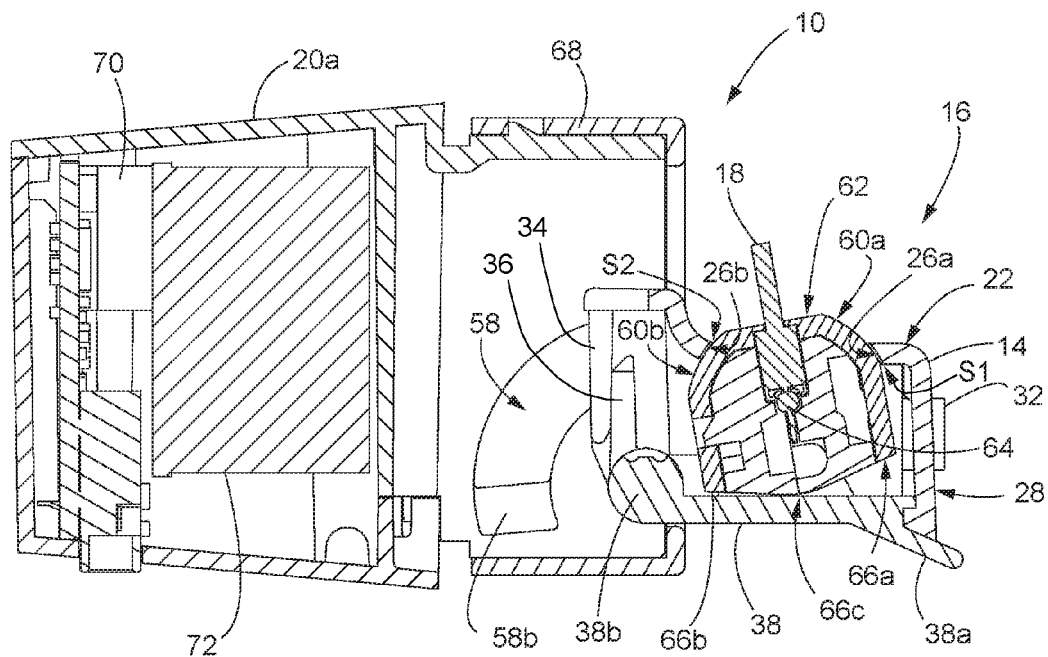
FIG. 6 is a side sectional elevation of the docking station, taken along section line VI-VI in FIG. 5.

Referring now to the drawings and the illustrative embodiments depicted therein, a docking station 10 for electronic devices is mountable in a power and data unit 12 (FIG. 1) that is configured for mounting at or near a work surface or in a work area, and provides users with access to power and/or data connectors such as low voltage DC power connectors (e.g., universal serial bus (USB), HDMI, serial port, Ethernet port, coaxial connector, or the like). Docking station 10 includes a pivotable dock housing 14 in which a pivotable device mount 16 is housed, such as shown in FIGS. 1-7. Device mount 16 includes an electrical/mechanical connector 18, and is pivotable relative to dock housing 14 between a forward position (FIGS. 2-4) and a rearward position (FIGS. 5 and 6). In the illustrated embodiment, dock housing 14 is pivotable relative to a main housing 20, between an extended or in-use position (shown) and a retracted or non-use position, such as in a manner that is more fully described in commonly-owned U.S. Pat. Nos. 8,482,252 and 8,559,172, both of which are hereby incorporated herein by reference in their entireties.

Figure 4:
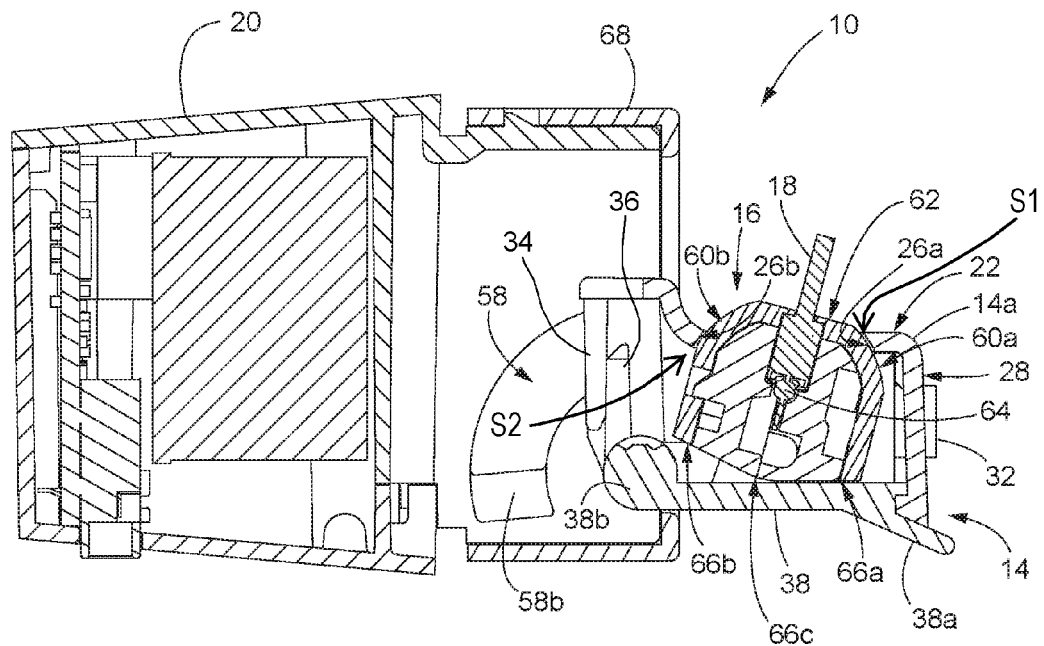
FIG. 4 is a side sectional view of the docking station taken along section line IV-IV in FIG. 3.
Figure 7:
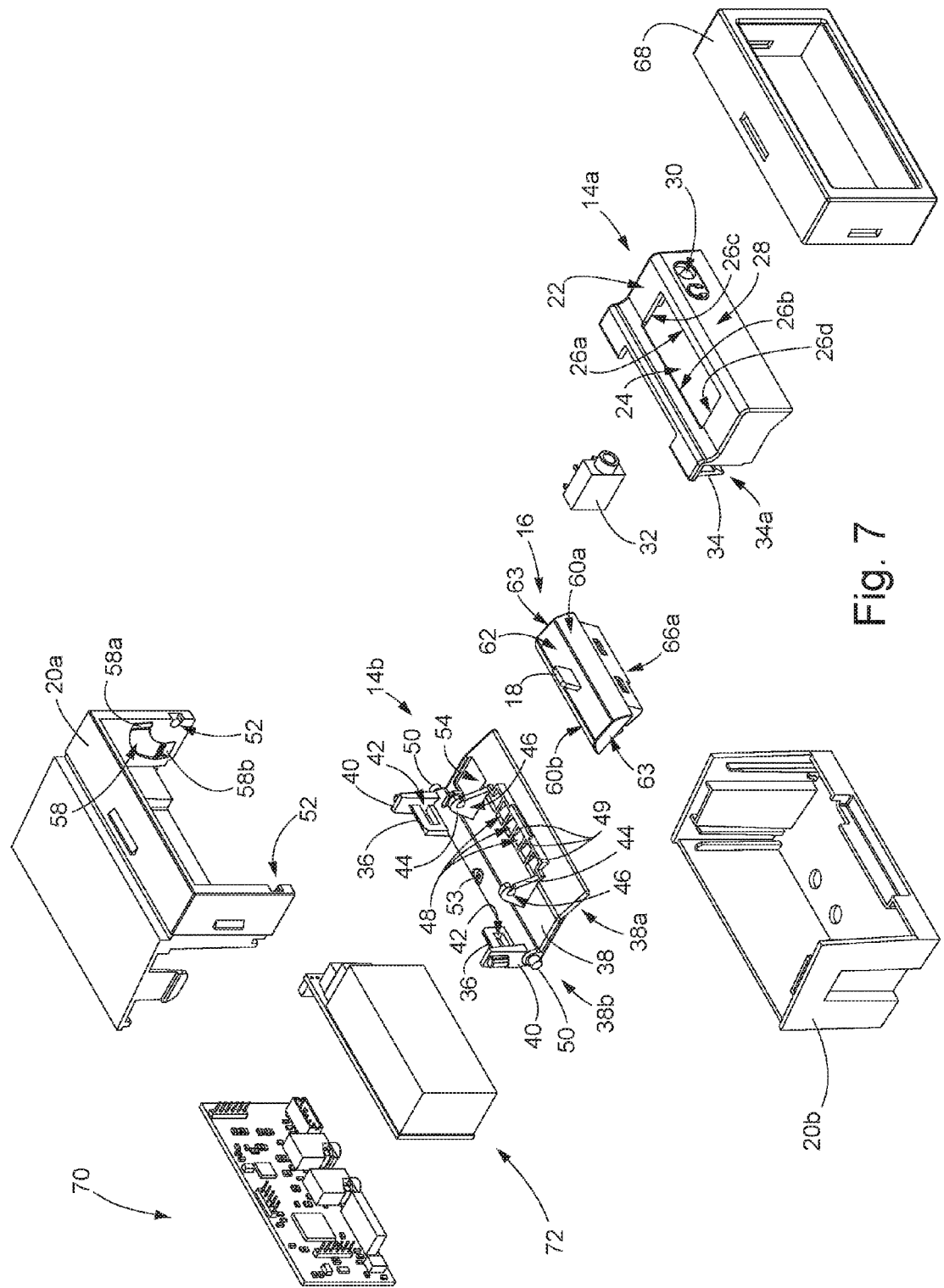
FIG. 7 is an exploded perspective view of the docking station.

Dock housing 14 is a two-piece housing including an upper housing portion 14a that is coupled to a lower housing portion 14b in a snap-together arrangement, such as shown in FIGS. 4, 6, and 7. Upper housing portion 14a includes an upper housing surface 22 that defines an opening 24 between a forward inside surface or edge 26a, a rearward inside surface or edge 26b, a left inside surface or edge 26c, and a right inside surface or edge 26d. Upper housing portion 14a further includes a forward surface 28 that defines an opening 30 (FIGS. 2, 7 and 10) that provides access to an audio jack 32 or other type of electronic or electrical connector. A pair of downwardly-extending resilient latch tabs 34 are located at a rear of upper housing portion 14a, and are configured to engage respective receiving portions 36 of lower housing portion 14b, such as shown in FIGS. 4 and 6.

Lower housing portion 14b includes a lower housing surface 38 including a downwardly-angled forward portion 38a and a rear hinge portion 38b. Receiving portions 36 extend upwardly from rear hinge portion 38b and are supported by respective upstanding walls 40 at opposite outboard sides of lower housing portion 14b (FIG. 7). Each receiving portion 36 defines an opening 42 that is engaged by a distal latch portion 34a of the respective latch tab 34. A pair of spaced-apart upstanding hinge pieces 44 extend upwardly from lower housing surface 38, and each includes a respective first hinge portion 46 in the form of a generally circular opening having a slot that is open at its forward end, to facilitate engagement by a corresponding hinge portion of device mount 16, as will be described below. A plurality of cavities 48 are defined between respective wall portions 49 that are located generally between upstanding hinge pieces 44, and extend part way along the forward downwardly-angled lip portion 38a of lower housing surface 38. Cavities 48 and their corresponding wall portions 49 are optional features that are provided to permit or facilitate the attachment or inclusion of additional elements associated with docking station 10, or to accommodate variations (or associated hardware) in device mount 16, and that can also serve to limit the maximum forward pivot angle of device mount 16, as will be described below.

A pair of hinge pins 50 extend laterally outwardly from the hinge portion 38b of lower housing surface 38, and are sized and shaped to be received in respective cavities or slots 52 that are formed in a forward edge portion of main housing 20, such as shown in FIG. 7. Hinge pins 50 may be unitarily formed with the other portions and surfaces of lower housing portion 14b, or may be respective opposite end portions of a cylindrical shaft that is held in place at rear hinge portion 38b by a threaded fastener 53, such as a grub screw or the like. A rectangular audio jack opening 54 is defined in lower housing surface 38, just outboard of the upstanding hinge piece 44 on the left side of lower housing portion 14b, and facilitates the mounting and wiring of audio jack 32. Optionally, each upstanding wall 40 includes a respective outwardly-extending projection 56 that is disposed in and rides along an arcuate channel 58 formed along an inside surface at a forward end portion of main housing 20 (FIGS. 4, 6 and 7), with arcuate channel 58 optionally including detent regions 58a, 58b that are selectively engaged by projections 56 to initially resist pivoting of movement of dock housing 14 out of its extended or retracted positions.

Device mount 16 includes a pair of upper arcuate surfaces including a forward arcuate surface 60a and a rearward arcuate surface 60b, with a generally planar central upper surface 62 disposed between arcuate surfaces 60a, 60b, such as shown in FIGS. 4, 6 and 7. A pair of opposite sidewalls 63 extend downwardly from opposite ends of the arcuate surfaces 60a, 60b and central upper surface 62. Arcuate surfaces 60a, 60b and central planar surface 62 cooperate to form a contiguous upper surface portion of device mount 16, which is wider than the spacing of upstanding hinge pieces 44 of lower housing portion 14b, so that hinge pieces 44 are substantially covered by the upper surface portion of device mount 16 when the device mount is coupled to lower housing portion 14b of dock housing 14. A second hinge portion in the form of one or two hinge pins 64 (FIGS. 4 and 6) is located directly beneath central planar surface 62, and is sized, shaped, and positioned for snap-fit engagement with first hinge portions (openings) 46 defined at upper end portions of upstanding hinge pieces 44, to define a generally horizontal pivot axis that is spaced above lower housing surface 38 of dock housing 14.

Optionally, central planar surface 62 may be engaged by a lower surface of an electronic device, to thereby support at least a portion of the weight of the electronic device that is coupled to connector 18. In the illustrated embodiment, central surface 62 is substantially planar, but it will be appreciated that the central area between the forward and rearward arcuate surfaces 60a, 60b could also be arcuate in shape, such as a continuation of the partial-cylindrical arcuate surfaces, whereby the upper surface portion of the device mount would be essentially half-cylindrical in shape.

The tight spacing of forward and rearward arcuate surfaces 60a, 60b with corresponding ones of the forward and rearward inside surfaces 26a, 26b of upper housing surface 22, and of sidewalls 63 with the respective corresponding left and right inside surfaces 26c, 26d of upper housing portion 14a, ensures that there is only a small gap, or substantially no gap at all, between the various outer surfaces 60a, 60b, 62, 63 of device mount 16 and the inside surfaces 26a-d that define opening 24 in dock housing 14. It will be appreciated that this arrangement reduces the risk or likelihood of contaminants entering an interior cavity of dock housing 14, to thereby reduce the risk of damage to electrical or mechanical components due to the inadvertent intrusion of contaminants such as spilled liquids, dust, grit, food particles, or the like.

The configurations of device mount 16 and upper housing portion 14a are similar to a ball-and-socket arrangement, except that the surfaces do not necessarily contact one another and are partially cylindrical in shape rather than partially spherical, and it is the interaction of hinge pins 64 with hinge portions 46 that permits the pivoting movement of device mount 16 rather than the engagement of outermost surfaces of the device mount with inner surfaces of the dock housing. Thus, forward and rearward arcuate surfaces 60a, 60b of device mount 16 are partially cylindrical in shape, with each point along the respective surfaces being substantially equidistant from the pivot axis defined through hinge pin 64. Similarly, forward and rearward inside surfaces 26a, 26b of upper housing surface 22 may be generally arcuate (partially cylindrical) in shape, with all points along these surfaces being substantially equidistant from the pivot axis defined through hinge ping 64. Thus, with reference to FIGS. 4 and 6, forward arcuate surface 60a will maintain substantially constant spacing S1 from forward inside surface 26a, and rearward arcuate surface 60b will maintain substantially fixed spacing S2 from rearward inside surface 26b during or throughout the full range of pivoting movement of device mount 16 relative to docking housing 14, so as to not create enlarged gaps through which contaminants may readily enter the interior of dock housing 14.

Optionally, device mount 16 and opening 24 may be sized so as to substantially eliminate any gaps between these components, to further reduce the likelihood that contaminants could intrude into dock housing 14. In addition, it is envisioned that a soft and/or flexible skirt or gasket material could be applied to upper housing portion 14a, surrounding opening 24, to provide a seal or dust jacket that contacts respective outer surfaces of device mount 16 as the device mount pivots relative to dock housing 14. In the illustrated embodiment, no pivot-resisting elements are included, so that pivoting movement of device mount 16 relative to dock housing 14 is resisted only by incidental friction at the interacting hinge portions and/or by incidental frictional contact of the upper arcuate surfaces of the device mount with corresponding surfaces of the dock housing. However, it is envisioned that pivot-resisting elements such as springs or resilient biasing members or components such as those described in commonly-owned U.S. Pat. Nos. 8,482,252 and 8,559,172, which are incorporated herein by reference, could be incorporated into the docking station of the present invention, such as to provide a centering function of device mount 16 relative to dock housing 14.

Device mount 16 further includes a lower surface or region having a forward lower surface portion 66a, a rearward lower surface portion 66b, and a centrally located central lower surface portion 66c, such as shown in FIGS. 4, 6 and 7. Referring to FIG. 4, forward lower surface portion 66a is positioned and oriented, relative to hinge pin 64, so that it will contact lower housing surface 38 to limit or prevent further forward-pivoting movement of device mount 16 relative to dock housing 14, with forward arcuate surface 60a of device mount 16 remaining in close proximity to forward inside surface 26a of upper housing portion 14a, and with rearward arcuate surface 60b of device mount 16 remaining in close proximity to rearward inside surface 26b of upper housing portion 14b. Similarly, and with reference to FIG. 6, rearward lower surface portion 66b is positioned and oriented, relative to hinge pin 64, so that it will contact lower housing surface 38 to limit or prevent further rearward-pivoting movement of device mount 16 relative to dock housing 14, with forward arcuate surface 60a of device mount 16 remaining in close proximity to forward inside surface 26a of upper housing portion 14a, and with rearward arcuate surface 60b of device mount 16 remaining in close proximity to rearward inside surface 26b of upper housing portion 14b. Central lower surface portion 66c of device mount 16 is located between the forward surface portion 66a and the rearward surface portion 66b, and is spaced below hinge pin 64 approximately the same distance by which hinge pin 64 is spaced above lower housing surface 38, so that central lower portion 66c remains in close proximity to (or in light contact with) lower housing surface 38 as device mount 16 pivots relative to dock housing 14, such as shown in FIGS. 4 and 6.

Forward lower surface portion 66a and rearward lower surface portion 66b are spaced radially outwardly from hinge pin 64 a greater distance than is central surface portion 66c, so that the forward and rearward lower surface portions 66a, 66b act as hard stops against further pivoting movement of device mount 16. The wall portions 49 that cooperate to define cavities 48 in lower housing portion 14b are contacted by forward lower surface portion 66a when device mount 16 reaches its forward most pivoting position, such as shown in FIG. 4, so that the height of wall portions 49 serve to limit or set the forward pivoting extent of device mount 16.

In the illustrated embodiment, main housing 20 is made up of an upper housing portion 20a and a lower housing portion 20b that are configured to snap together during assembly, and which cooperate with a front bezel or face plate 68 to secure dock housing 14 to main housing 20, in a manner that permits limited pivoting movement of dock housing 14, which may be more fully understood with reference to the above-identified commonly-owned U.S. Pat. Nos. 8,482,252 and 8,559,172, which are incorporated herein by reference. Docking station 10 further includes a circuit board 70 and a voltage transformer 72 with cover that protects the electrical circuitry when dock housing 14 is pivoted out to an in-use position as shown in the drawings. Circuit board 70 handles all or a portion of the electrical and/or electronic functions of docking station 10 such as, for example, directing audio signals received from the portable electronic device via connector 18 to audio jack 32, and directing and/or converting electrical or electronic signals to or from the electronic device coupled to connector 18 and other electrical or electronic devices that may be coupled to docking station 10, such as a video projector, audio speakers, an internet connection or other communication source, and the like. Voltage transformer 72 converts or transforms a high voltage AC power input to a low voltage DC power output at connector 18, such as for charging the battery of a portable electronic device.

Figure 1:
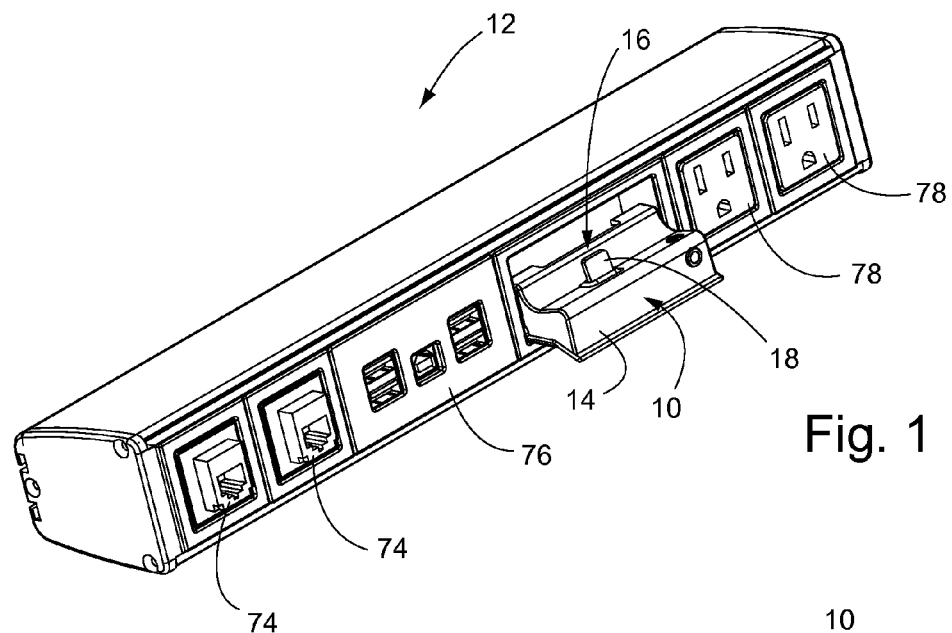
FIG. 1 is perspective view of a power and data center incorporating a docking station in accordance with the present invention.
Figure 2:
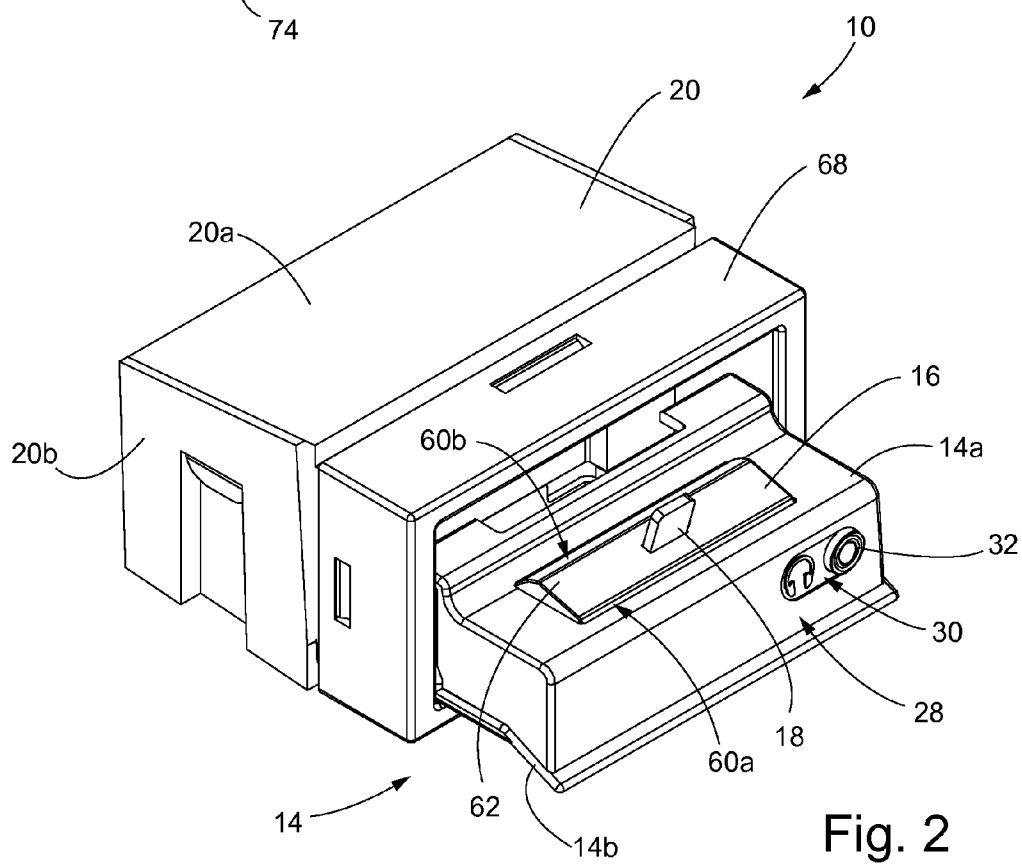
FIG. 2 is a top plan view of the docking station of FIG. 1, in which the connector is shown pivoted forward.
Figure 3:
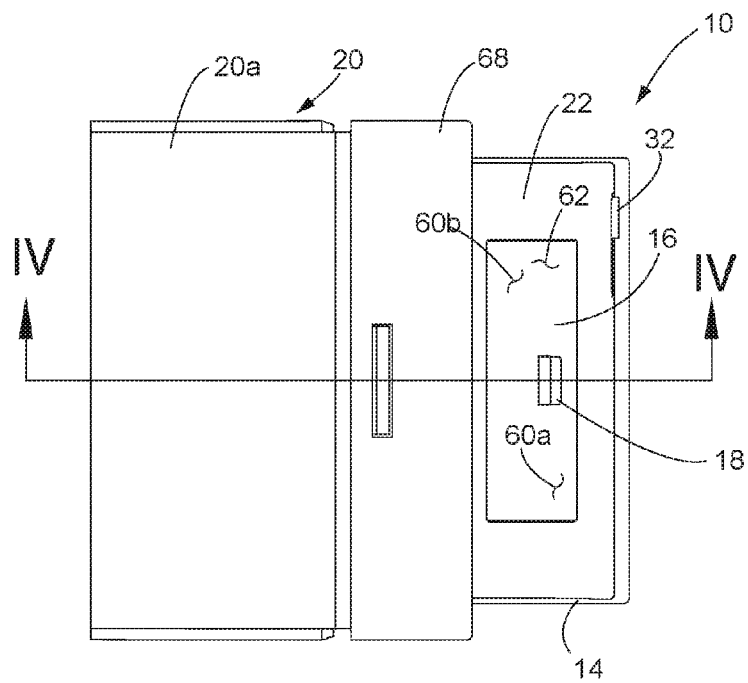
FIG. 3 is a top plan view of the docking station of FIG. 2.

Referring to FIG. 1, and as briefly noted above, docking station 10 is configured for mounting to power and data unit 12, which can be adapted to provide various other electrical devices, connections, and functions for a user, such as is more fully described in commonly-owned U.S. Pat. No. 8,480,429, which is hereby incorporated herein by reference in its entirety. For example, in addition to docking station 10, power and data unit 12 may be fitted with electronic data ports 74 (such as telephone jacks, Ethernet or HDMI ports, or the like), a video receptacle assembly 76, and high voltage AC power receptacles 78. Although docking station 10, and particularly its main housing 20, are configured for mounting at power and data unit 12, it will be appreciated that the docking station of present invention would be equally well suited for freestanding applications or different types of mounting arrangements and locations, such as by altering the configuration of its various housings, without departing from the spirit and scope of the present invention.

Accordingly, the docking station of the present invention provides a mechanical support and an electrical or electronic connection to a portable or electronic device, in a manner that substantially precludes or prevents the intrusion of contaminants, such as spilled liquids, dust, food particles, or the like, into areas where electronic components and connections are made or established, and permits pivoting movement of the portable electronic device according to a particular user's preferences, substantially without creating enlarged gaps that would be more conducive to the intrusion of contaminants.

Changes and modifications in the specifically-described embodiments may be carried out without departing from the principles of the present invention, which is intended to be limited only by the scope of the appended claims as interpreted according to the principles of patent law including the doctrine of equivalents.

The embodiments of the invention in which an exclusive property or privilege is claimed are defined as follows:

1. A docking station for supporting and electrically communicating with an electronic device, said docking station comprising: a dock housing including upper and lower housing surfaces defining a cavity there between, said upper housing surface defining an opening between a forward inside surface and a rearward inside surface; a first hinge portion spaced above said lower housing surface, said first hinge portion defining a pivot axis; a device mount configured to support an electronic device and having a lower mount portion and an upper mount portion having an arcuate surface with forward and rearward portions, said device mount including a second hinge portion spaced above said lower mount portion and configured to engage said first hinge portion whereby said device mount is pivotably coupled to said first hinge portion and movable between a forward position and a rearward position; and an electrical connector at said device mount, said electrical connector projecting through said opening and configured to electrically engage the electrical device when the electrical device is supported at said device mount; wherein said pivot axis is located such that as said device mount is pivoted between said forward position and said rearward position, said forward portion of said upper arcuate surface maintains a fixed spacing relative to said forward inside surface of said upper housing surface, and said rearward portion of said upper arcuate surface maintains a fixed spacing relative to said rearward inside surface of said upper housing surface.

2. The docking station of claim 1, wherein said device mount comprises a lower surface with forward and rearward portions, and wherein when said device mount is in said forward position said forward portion of said lower surface contacts said lower housing surface, and when said device mount is in said rearward position said rearward portion of said lower surface contacts said lower housing surface.

3. The docking station of claim 1, wherein said device mount and said dock housing are configured so that pivoting movement of said device mount relative to said dock housing is resisted only by incidental friction at said first and second hinge portions or by incidental contact of said forward and rearward portions of said upper arcuate surface with said forward and rearward inside surfaces of said upper housing surface, or both.

4. The docking station of claim 1, wherein a portion of said upper arcuate surface of said device mount projects through said opening of said upper housing surface.

5. The docking station of claim 1, further comprising a main housing in which said dock housing is pivotably mounted, wherein said dock housing is movable between an in-use position in which said dock housing is extended from said main housing, and a non-use position in which said dock housing is at least partially retracted into said main housing.

6. A docking station for supporting and electrically communicating with an electronic device, said docking station comprising: a main housing; a dock housing including a base and a cover, said dock housing defining a cavity between said base and said cover, said cover defining an opening between a forward inside surface and a rearward inside surface, wherein said dock housing is movable between an in-use position in which said dock housing is extended from said main housing, and a non-use position in which said dock housing is at least partially retracted into said main housing; a first hinge portion projecting upwardly from said base, said first hinge portion defining a pivot axis spaced above said base; a device mount coupled to said base in said cavity and configured to support an electronic device, said device mount having an upper arcuate surface with forward and rearward portions, a lower surface with forward and rearward portions, and a second hinge portion spaced above said lower surface and configured to engage said first hinge portion whereby said device mount is pivotable coupled to said base; and an electrical connector at said device mount, said electrical connector projecting through said opening and configured to electrically engage the electrical device when the electrical device is supported at said device mount; wherein when said dock housing is in said in-use position, said device mount is pivotable between a forward position in which said forward portion of said lower surface contacts said base, and a rearward position in which said rearward portion of said lower surface contacts said base; wherein said pivot axis is located such that as said device mount is pivoted between said forward position and said rearward position, said forward portion of said upper arcuate surface remains in substantially fixed spacing relative to said forward inside surface of said cover, and said rearward portion of said upper arcuate surface remains in substantially fixed spacing relative to said rearward inside surface of said cover; and wherein said device mount and said dock housing are configured so that pivoting movement of said device mount relative to said dock housing is resisted only by incidental friction at said first and second hinge portions or by incidental contact of said forward and rearward portions of said upper arcuate surface with said forward and rearward inside surfaces of said cover, or both.

7. The docking station of claim 6, wherein a portion of said upper arcuate surface of said device mount projects through said opening of said upper housing surface.

8. The docking station of claim 7, wherein said upper arcuate surface comprises a generally planar central surface disposed between said forward and rearward portions, and wherein said generally planar central surface projects through said opening of said upper housing surface.

9. The docking station of claim 8, wherein said electrical connector is positioned at said generally planar central surface.

10. The docking station of claim 9, wherein said generally planar central surface is configured to be engaged by a lower surface of the electronic device, wherein at least a portion of the weight of the electronic device is supported by said generally planar central surface.

11. A docking station for supporting and electrically communicating with an electronic device, said docking station comprising: a main housing; a dock housing including a base and a cover, said dock housing defining a cavity between said base and said cover, said cover defining an opening between a forward inside surface and a rearward inside surface, wherein said dock housing is movable between an in-use position in which said dock housing is extended from said main housing, and a non-use position in which said dock housing is at least partially retracted into said main housing; a first hinge portion projecting upwardly from said base, said first hinge portion defining a pivot axis spaced above said base; a device mount mounted in said cavity and configured to support an electronic device, said device mount having an upper arcuate surface with forward and rearward portions, a lower surface with forward and rearward portions, and a second hinge portion spaced above said lower surface and configured to engage said first hinge portion whereby said device mount is pivotably coupled to said first hinge portion; and an electrical connector at said device mount, said electrical connector configured to electrically engage the electrical device when the electrical device is supported at said device mount; wherein when said dock housing is in said in-use position, said device mount is pivotable between a forward position in which said forward portion of said lower surface contacts said base, and a rearward position in which said rearward portion of said lower surface contacts said base;

wherein said pivot axis is located such that as said device mount is pivoted between said forward position and said rearward position, said forward portion of said upper arcuate surface remains in substantially fixed spacing relative to said forward inside surface of said cover, and said rearward portion of said upper arcuate surface remains in substantially fixed spacing relative to said rearward inside surface of said cover; and wherein pivoting movement of said device mount relative to said dock housing is resisted only by incidental friction at said first and second hinge portions or by incidental contact of said forward and rearward portions of said upper arcuate surface with said forward and rearward inside surfaces of said cover, or both.

\* \* \* \* \*